United States Patent [19]

Traber et al.

[11] Patent Number: 5,209,758
[45] Date of Patent: May 11, 1993

[54] PASTY OR SOLID DYE MELTS: DISPERSE DYE AND NONIONIC AND/OR CATIONIC SURFACTANTS

[75] Inventors: Rainer H. Traber, Reinach; Ulrich Strahm, Aesch, both of Switzerland

[73] Assignee: Ciba-Geigy Corporation, Ardsley, N.Y.

[21] Appl. No.: 802,676

[22] Filed: Dec. 4, 1991

[30] Foreign Application Priority Data

Dec. 11, 1990 [CH] Switzerland .................. 3904/90

[51] Int. Cl.⁵ .................. C09B 67/10; C09B 67/38; C09B 67/42
[52] U.S. Cl. .................. 8/526; 8/527; 8/528; 8/552; 8/606; 8/610; 8/906; 8/907; 8/922; 8/924
[58] Field of Search .................. 8/526, 528, 610

[56] References Cited

U.S. PATENT DOCUMENTS

| | | | |
|---|---|---|---|
| 4,249,902 | 2/1981 | Kruckenberg et al. | 8/525 |
| 4,523,923 | 6/1985 | Buchel et al. | 8/524 |
| 4,655,786 | 4/1987 | Navratil et al. | 8/475 |
| 4,715,863 | 12/1987 | Navratil et al. | 8/440 |

FOREIGN PATENT DOCUMENTS

| | | |
|---|---|---|
| 803287 | 10/1958 | United Kingdom . |
| 1025424 | 4/1966 | United Kingdom . |
| 1480319 | 7/1977 | United Kingdom . |

OTHER PUBLICATIONS

Chem. Abstract 67/74481.
Chem. Abstract 109/232697.

*Primary Examiner*—A. Lionel Clingman
*Attorney, Agent, or Firm*—Marla J. Mathias; George R. Dohmann

[57] ABSTRACT

The invention relates to novel pasty or solid dye melts which contain, per 1 part of a sparingly water-soluble or water-insoluble dye whose melting point is higher than 150° C., 2 to less than 5 parts of a nonionic surfactant with a melting point of 25°–100° C. and having an HLB value of 13 to 19 or of a cationic surfactant with a melting point of 25°–100° C., or a mixture of said surfactants, to a process for their preparation and to the use of said melts, preferably for dyeing and printing polyester materials, to give level dyeings having a high degree of exhaustion.

10 Claims, No Drawings

PASTY OR SOLID DYE MELTS: DISPERSE DYE AND NONIONIC AND/OR CATIONIC SURFACTANTS

The present invention relates to pasty or solid melts, to a process for their preparation, and to the use thereof for dyeing and printing textile material, especially hydrophobic fibre material.

Hydrophobic fibre material, mainly polyester yarns or woven or knitted fabrics made from polyester fibres, are dyed with disperse dyes either under normal pressure in the temperature range up to 100° C. in the presence of a carrier, or in a closed dyeing machine in the temperature range from 120°–150° C. under pressure. The disadvantage of both processes is that they require disperse dyes which are as far as possible in a finely particulate, stably dispersed form. Consequently, after their synthesis the dyes have to be subjected to troublesome milling operations, as in stirred ball mills or sand mills, together with suitable dispersants. Finally, the finely particulate disperse dye must be converted into a stable, storable liquid formulation which does not have a propensity to reagglomerate, or subjected to a mild drying process in order to give a dyestuff powder which is rapidly dispersible in the dye liquor without formation of lumps. Furthermore, it has proved difficult to develop dye formulations which contain dyes with a fairly high melting point.

It is therefore an object of this invention to provide industrially useful dye formulations which are easy to prepare. This object is achieved with the novel dye formulations of this invention which take the form of dye melts.

The dye melts of this invention contain, per 1 part of a sparingly water-soluble or water-insoluble dye whose melting point is higher than 150° C., 2 to less than 5 parts of a nonionic surfactant with a melting point of 25°–100° C. and having an HLB value of 13 to 19 or of a cationic surfactant with a melting point of 25°–100° C., or a mixture of said surfactants.

The novel dye melts of this invention afford substantial advantages. In particular, the troublesome milling of the dyes can be dispensed with and the stability of the dye dispersions is no longer a problem. In addition, the use of these dye melts in dyeing processes makes it possible to obtain level dyeings with a high degree of exhaustion.

The sparingly water-soluble or water-insoluble dyes with a melting point above 150° C. suitable for use in the practice of this invention are in particular disperse dyes which can belong to a very wide range of dye classes. Typically they are azo, anthraquinone, nitro, methine, stryl, azostyryl, perinone, quinophthalone, acridone or naphthoquinoneimine dyes which do not contain water-solubilising groups. Preferred disperse dyes are metal-free monoazo or disazo dyes, nitro dyes, acridone dyes, anthraquinone dyes or quinophthalone dyes.

Suitable nonionic surfactants are those which have a melting point of 25°–100° C. and a HLB value of 13 to 19. The HLB value (hydrophilic-lipophilic balance) is an empirical value for characterizing the hydrophilic and lipophilic properties of non-ionic surfactants. Exemplary of such surfactants are reaction products of preferably 5 to 100 mol of ethylene oxide and/or propylene oxide with 1 mol of the following compounds a) to g):
a) a low molecular, aliphatic polyol, or
b) a saturated and/or unsaturated fatty alcohol of 8 to 22 carbon atoms, or
c) an alkylphenol containing 4 to 12 carbon atoms in the alkyl moiety, or
d) a hydroxybiphenyl, or
e) a saturated and/or unsaturated fatty amine containing 8 to 22 carbon atoms, or
f) a saturated and/or unsaturated fatty acid containing 8 to 22 carbon atoms, or
g) a saturated and/or unsaturated fatty acid (N,N-bishydroxyalkyl)amide.

Individual preferred products are: alkyl polyglycol ethers such as $C_{16}$–$C_{18}$alcohol ethoxylate with about 25 mol of ethylene oxide, cetyl oleyl ethoxylate with about 19 mol of ethylene oxide and $C_{16}$–$C_{18}$alkylethoxylate with about 50 mol of ethylene oxide; and also mono-, di- and trialkylaryl polyglycol ethers such as tributylphenol ethoxylate with about 13 mol or about 18 mol of ethylene oxide, nonylphenol ethoxylate with about 30 mol of ethylene oxide, di-$C_9$–$C_{12}$alkylphenol ethoxylate with about 49 mol of ethylene oxide, and dinonylphenol ethoxylate with about 18 mol of ethylene oxide.

Mixtures of these reaction products with one another may also be used. These mixtures are obtained by mixing individual reaction products or direct by ethoxylating a mixture of the compounds from which the reaction products are derived.

Particularly suitable surfactants with a melting point of 25°–100° C. are quaternary alkylammonium compounds of formula

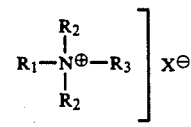

wherein the substituents $R_1$ to $R_3$ and the symbol $X^{\ominus}$ have the following meanings:
$R_1$ is a saturated or unsaturated alkyl radical of 8 to 22 carbon atoms;
each $R_2$ is independently an alkyl radical of 1 to 4 carbon atoms or a polyalkylene oxide chain containing 3 to 30 ethylene oxide and/or propylene oxide units or ethylene oxide and styrene oxide units;
$R_3$ is an alkyl radical of 1 to 4 carbon atoms which is unsubstituted or substituted by a hydroxy, methoxy or ethoxy group or by a carbamoyl or phenyl radical;
$X^{\ominus}$ is the anion of an organic or inorganic acid, such as acetate, chloride, bromide, sulfate or methosulfate.

Such compounds are known or can be obtained by known methods, as by reaction of a fatty amine or a mixture of fatty amines, such as coconut fatty amine, with ethylene oxide and/or propylene oxide and subsequent quaternisation of the resultant alkoxylate, typically with dimethyl sulfate (q. v. H. Stache, Tensid-Taschenbuch (Surfactant Manual); Carl Hanser Verlag 1981).

Typical examples of quaternary fatty amine alkoxylates are:
the polyadduct of about 8 mol of ethylene oxide with 1 mol of tallow fatty amine, quaternised with chloroacetamide;

the polyadduct of about 30 mol of ethylene oxide with 1 mol of a $C_{18}$-$C_{22}$fatty amine, quaternised with dimethyl sulfate;

the polyadduct of about 30 mol of ethylene oxide with 1 mol of laurylamine, quaternised with dimethyl sulfate;

the polyadduct of about 15 mol of ethylene oxide with 1 mol of laurylamine, quaternised with dimethyl sulfate;

the polyadduct of about 15 mol of ethylene oxide with 1 mol of stearylamine, quaternised with dimethyl sulfate;

the polyadduct of 1 mol of styrene oxide with about 30 mol of ethylene oxide and 1 mol of stearylamine, quaternised with dimethyl sulfate;

the polyadduct of 6 mol of propylene oxide with about 30 mol of ethylene oxide and 1 mol of caprylamine, quaternised with dimethyl sulfate;

the polyadduct of 1 mol of styrene oxide with about 20 mol of ethylene oxide and 1 mol of stearylamine, quaternised with dimethyl sulfate;

Also suitable are $C_8$-$C_{22}$alkylpyridinium salts, preferably chlorides and bromides, such as hexadecylpyridinium chloride. Mixtures of such compounds are also suitable, in which case the quaternary ammonium compounds may be obtained by starting from mixtures of fatty amines, for example coconut fatty amine, in the preparation of these surfactants.

The nonionic surfactants are preferred, especially the alkyl polyglycol ethers and the mono-, di- or trialkylaryl polyglycol ethers.

The mixture ratio (in parts by weight) of dye to surfactant is 1 to 2 to less than 5 and, preferably, 1 to about 3.

A preferred melt contains, per 1 part of a disperse dye, about 3 parts of a nonionic surfactant, preferably an alkyl polyglycol ether with a melting point of 25°–100° C. and having a HLB value of 13 to 19.

The pasty or solid dye melts are prepared by mixing 1 part of a sparingly water-soluble or water-insoluble dye with a melting point above 150° C. with 2 to less than 5 parts of a nonionic surfactant with a melting point of 25°–100° C. and having a HLB value of 13 to 19, or of a cationic surfactant with a melting point of 25°–100° C., or of a mixture of said surfactants and with an optional solubiliser, and melting the dye/surfactant mixture so obtained.

In principle, the dyes can be used without any aftertreatment, i.e. direct from their synthesis, as in the form of the moist press cake (crude dye), of the synthesis solution or suspension or of a dyestuff oil.

Suitable solubilisers are preferably aliphatic ketones such as acetone, or aliphatic alcohols such as methanol and ethanol, as well as other known dipolar solvents with a boiling point of or below 100° C., such as formamide, acetonitrile and nitromethane. The solubiliser is used in an amount of 0 to 1 liter per 1 g of dye.

The process consists in mixing the specific dye with the specific surfactant in the given amounts, together with the optional solubiliser, and heating the mixture under reflux conditions to a temperature ranging from 60°–180° C., preferably from 80°–130° C. The solubiliser, if present, is thereafter removed by distillation. Upon cooling, the mixture of dye and surfactant solidifies to a pasty or solid melt which may be coarsely ground. The melt temperature is preferably in the range from 80°–90° C.

The melt, which has a shelf-life of several months, can then be processed by adding warm water (c. 60°–80° C.) and optional dyeing auxiliaries to give a soluble dye formulation, which can subsequently be used for dyeing and printing hydrophobic fibre materials.

Further, the dye melt of this invention can also be added direct or metered continuously to the dyebath.

Exemplary of suitable dyeing auxiliaries which may conveniently be added in minor amounts are: acids, preferably organic lower monocarboxylic acids such as formic acid or acetic acid; buffer salts, such as ammonium sulfate or sodium acetate; wetting agents; emulsifiers or antifoams.

Hydrophobic fibre materials which are dyeable by the process of this invention are mainly those made from linear high-molecular weight esters of aromatic polycarboxylic acids and polyfunctional alcohols, typically from terephthalic acid and ethylene glycol or dimethylcyclohexane and copolymers of terephthalic acid and isophthalic acid and ethylene glycol. Polyester fibre material is preferred. Provided the requisite apparatus is available, these materials can be in any form of presentation, such as flocks, slubbing, yarn, texturised filaments, woven or knitted goods. The dyeing temperature for these materials is preferably in the range from 120°–150° C. for the HT process, and up to 100° C. for the carrier process.

The process of this invention can also be used for dyeing polyamide material, for example polyamide 6, polyamide 66 or also polyamide 12. The dyeing temperature for these materials is preferably in the range from 98°–100° C.

The liquor to goods ratio is normally from 1:5 to 1:50; and the dyeing time is from 5 to 60 minutes.

The invention is illustrated by the following Examples, in which parts and percentages are by weight.

EXAMPLES 1-14: (PREPARATION OF THE DYE MELTS)

Crude dye and surfactant (as in Table 1) are mixed and, as may be desired or necessary, dissolved in a solubiliser. The mixture is heated to 90° C. on a rotary evaporator, whereby the solubiliser—if present—is removed by distillation and the dye/surfactant mixture melts to give a pasty or solid dye melt.

TABLE 1

| Ex. | Dye of formula/Amount | Surfactant Amount/HLB value/mp °C. | Solubiliser/Amount |
|---|---|---|---|
| 1 | 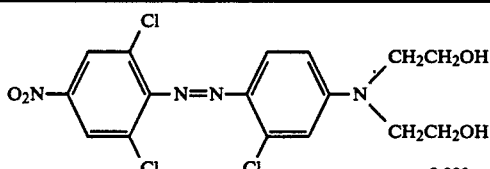 0.092 g | dinonylphenol ethoxylate with 18 mol of ethylene oxide 0.276 g/16/35–40° | acetone/50 ml |

TABLE 1-continued

| Ex. | Dye of formula/Amount | Surfactant Amount/HLB value/mp °C. | Solubiliser/ Amount |
|---|---|---|---|
| 2 | Dye: 2,6-dichloro-4-nitrophenyl azo coupled to 3-chloro-N,N-bis(2-hydroxyethyl)aniline, 0.092 g | $C_{16}$–$C_{18}$alkylethoxylate with 50 mol of ethylene oxide 0.276 g/18/c. 40° | acetone/50 ml |
| 3 | Same dye, 0.092 g | $C_{16}$–$C_{18}$alkylethoxylate with 50 mol of ethylene oxide 0.184 g/18/c. 40° | acetone/50 ml |
| 4 | Same dye, 0.092 g | cetyl-oleyl ethoxylate with 19 mol of ethylene oxide 0.276 g/15.4/c. 36° | acetone/50 ml |
| 5 | Same dye, 0.092 g | cetyl-oleyl ethoxylate with 19 mol of ethylene oxide 0.276 g/15.4/c. 36° | — |
| 6 | Same dye, 0.092 g | hexadecylpyridinium chloride 0.184 g/ /c. 78–82° | — |
| 7 | Same dye, 0.092 g | di-$C_9$–$C_{12}$alkylphenol ethoxylate with 49 mol of ethylene oxide 0.276 g/17.2/c. 40° | acetone/50 ml |
| 8 | Same dye, 0.092 g | hexadecylpyridinium chloride 0.276 g/—/c. 78–82° | acetone/50 ml |
| 9 | Quinoline-indandione dye (3-hydroxy-2-(1,3-dioxoindan-2-ylidene)-2,3-dihydroquinoline), 0.056 g | di-$C_9$–$C_{12}$alkylphenol ethoxylate with 49 mol of ethylene oxide 0.168 g/17.2/c. 40° | acetone/50 ml |

TABLE 1-continued

| Ex. | Dye of formula/Amount | Surfactant Amount/HLB value/mp °C. | Solubiliser/ Amount |
|---|---|---|---|
| 10 | 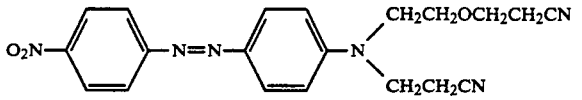 0.096 g | di-C9-C12alkylphenol ethoxylate with 49 mol of ethylene oxide 0.288 g/17.2/c. 40° | acetone/50 ml |
| 11 | 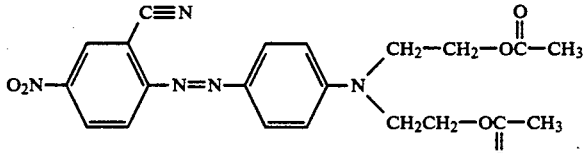 0.088 g | di-C9-C12alkylphenol ethoxylate with 49 mol of ethylene oxide 0.264 g/17.2/c. 40° | acetone/50 ml |
| 12 | 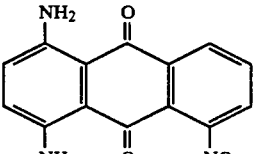 0.100 g | di-C9-C12alkylphenol ethoxylate with 49 mol of ethylene oxide 0.300 g/17.2/c. 40° | acetone/50 ml |
| 13 | 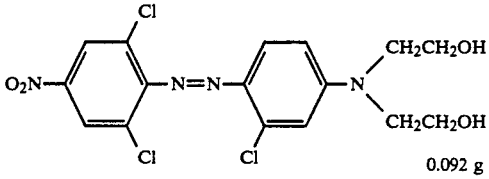 0.092 g | dinonylphenol ethoxylate with 18 mol of ethylene oxide 0.276 g/16/35-40° | — |
| 14 | 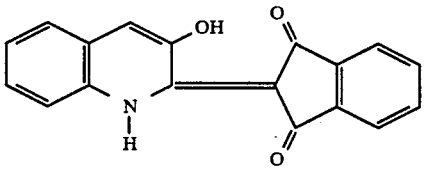 0.056 g | di-C9-C12alkylphenol ethoxylat with 49 mol of ethylene oxide 0.252 g/17.2/c. 40° C. | acetone/50 ml |

EXAMPLES 15-18 (DYEING PROCESS)

The dye melt obtained according to Examples 1-14 is in a formulating vessel. This melt is processed to a soluble formulation with 375 ml of warm water of 70° C. and 0.75 g of ammonium sulfate. Then 30 g of Tersuisse ® polyester tricot fabric type 2032 are put into this dyebath and dyeing is carried out by a HT temperature programme conventionally used for disperse dyes, i.e. the liquor with the fabric is heated to about 130° C. over 15-45 minutes and this temperature is kept for 20-60 minutes, after which the fabric is removed from the bath. A level polyester dyeing with a high degree of exhaustion is obtained (q.v. Table 2).

TABLE 2

| Ex. | Dye melt of Example | Dyeing on polyester | Degree of exhaustion |
|---|---|---|---|
| 15 | 1 | brown | >98.0% |
| 16 | 2 | brown | >90.0% |
| 17 | 3 | brown | >87.0% |
| 18 | 4 | brown | >88.2% |
| 19 | 5 | brown | >87.0% |
| 20 | 6 | brown | >90.0% |
| 21 | 7 | brown | >92.0% |
| 22 | 8 | brown | >88.0% |
| 23 | 9 | yellow | >99.0% |
| 24 | 10 | orange | >98.0% |
| 25 | 11 | red | >97.0% |
| 26 | 12 | violet | >93.0% |
| 27 | 13 | brown | >99.0% |
| 28 | 14 | yellow | >97.0% |

What is claimed is:

1. A pasty or solid dye melt which contains, per 1 part of a disperse dye for which the melting point is higher than 150° C., 2 to less than 5 parts of a nonionic surfactant with a melting point of 25°-100° C. and having an HLB value of 13 to 19, wherein the nonionic surfactant is a reaction product of 5 to 100 mol of ethylene oxide and/or propylene oxide with 1 mol of a compound selected from the group consisting of
   a) a low molecular, aliphatic polyol,
   b) a saturated and/or unsaturated fatty alcohol of 8 to 22 carbon atoms,
   c) an alkylphenol containing 4 to 12 carbon atoms in the alkyl moiety,
   d) a hydroxybiphenyl,
   e) a saturated and/or unsaturated fatty amine containing 8 to 22 carbon atoms, f) a saturated and/or unsaturated fatty acid containing 8 to 22 carbon atoms, and g) a saturated and/or unsaturated fatty acid (N,N-bishydroxyalkyl)amide or of a cationic surfactant with a melting point of 25°–100° C., or a mixture of said surfactants.

2. A pasty or solid dye melt according to claim 1, which contains, per 1 part of a sparingly water-soluble or water-insoluble dye whose melting point is higher than 150° C., about 3 parts of a nonionic or cationic surfactant.

3. A pasty or solid dye melt according to claim 1, which contains a nonionic surfactant.

4. A pasty or solid dye melt according to claim 1, which contains a cationic surfactant.

5. A pasty or solid dye melt according to claim 4, wherein the cationic surfactant is an alkylammonium compound of formula

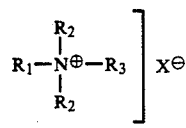

wherein
$R_1$ is a saturated or unsaturated alkyl radical of 8 to 22 carbon atoms;
each $R_2$ is independently an alkyl radical of 1 to 4 carbon atoms or a polyalkylene oxide chain containing 3 to 30 ethylene oxide and/or propylene oxide units or ethylene oxide and styrene oxide units;
$R_3$ is an alkyl radical of 1 to 4 carbon atoms which is unsubstituted or substituted by a hydroxy, methoxy or ethoxy group or by a carbamoyl or phenyl radical; and
$X^\ominus$ is the anion of an organic or inorganic acid.

6. A pasty or solid dye melt according to claim 1, which contains, per 1 part of a disperse dye, about 3 parts of a nonionic surfactant with a melting point of 25°–100° C. and having a HLB value of 13 to 19.

7. A process for the preparation of a pasty or solid dye melt as claimed in claim 1, which comprises mixing 1 part of a sparingly water-soluble or water-insoluble dye with a melting point above 150° C. with 2 to less than 5 parts of a nonionic surfactant with a melting point of 25°–100° C. and having a HLB value of 13 to 19, or of a cationic surfactant with a melting point of 25°–100° C., or of a mixture of said surfactants and with an optional solubiliser, and melting the dye/surfactant mixture so obtained.

8. A method of dyeing or printing polyester or polyamide textile materials, which comprises applying an effective amount of a dye formulation obtained from the pasty or solid dye melt according to claim 1 to the textile materials.

9. A pasty or solid dye melt according to claim 3, wherein the nonionic surfactant is (I) a $C_{16}$–$C_{18}$alcohol ethoxylate with about 25 mol of ethylene oxide, (II) a cetyl oleyl ethoxylate with about 19 mol of ethylene oxide, (III) a $C_{16}$–$C_{18}$alkylethoxylate with about 50 mol of ethylene oxide, (IV) a tributylphenol ethoxylate with about 13 mol or about 18 mol of ethylene oxide, (V) a nonylphenol ethoxylate with about 30 mol of ethylene oxide, (VI) a di-$C_9$–$C_{12}$alkylphenol ethoxylate with about 49 mol of ethylene oxide, or (VII) a dinonylphenol ethoxylate with about 18 mol of ethylene oxide.

10. A pasty or solid dye melt according to claim 4, wherein the cationic surfactant is (I) a polyadduct of about 8 mol of ethylene oxide with 1 mol of tallow fatty amine, quaternised with chloroacetamide; (II) a polyadduct of about 30 mol of ethylene oxide with 1 mol of a $C_{18}$–$C_{22}$fatty amine, quaternised with dimethyl sulfate; (III) a polyadduct of about 30 mol of ethylene oxide with 1 mol of laurylamine, quaternised with dimethyl sulfate; (IV) a polyadduct of about 15 mol of ethylene oxide with 1 mol of laurylamine, quaternised with dimethyl sulfate; (V) a polyadduct of about 15 mol of ethylene oxide with 1 mol of stearylamine, quaternised with dimethyl sulfate; (VI) a polyadduct of 1 mol of styrene oxide with about 30 mol of ethylene oxide and 1 mol of stearylamine, quaternised with dimethyl sulfate; (VII) a polyadduct of 6 mol of propylene oxide with about 30 mol of ethylene oxide and 1 mol of caprylamine, quaternised with dimethyl sulfate; (VIII) a polyadduct of 1 mol of styrene oxide with about 20 mol of ethylene oxide and 1 mol of stearylamine, quaternised with dimethyl sulfate; or (IX) a $C_8$–$C_{22}$alkylpyridinium salt.

* * * * *